Jan. 27, 1931.  J. GOOD  1,790,372
ENGINE LUBRICATING SYSTEM
Filed Nov. 19, 1925   2 Sheets-Sheet 1
Fig.1,
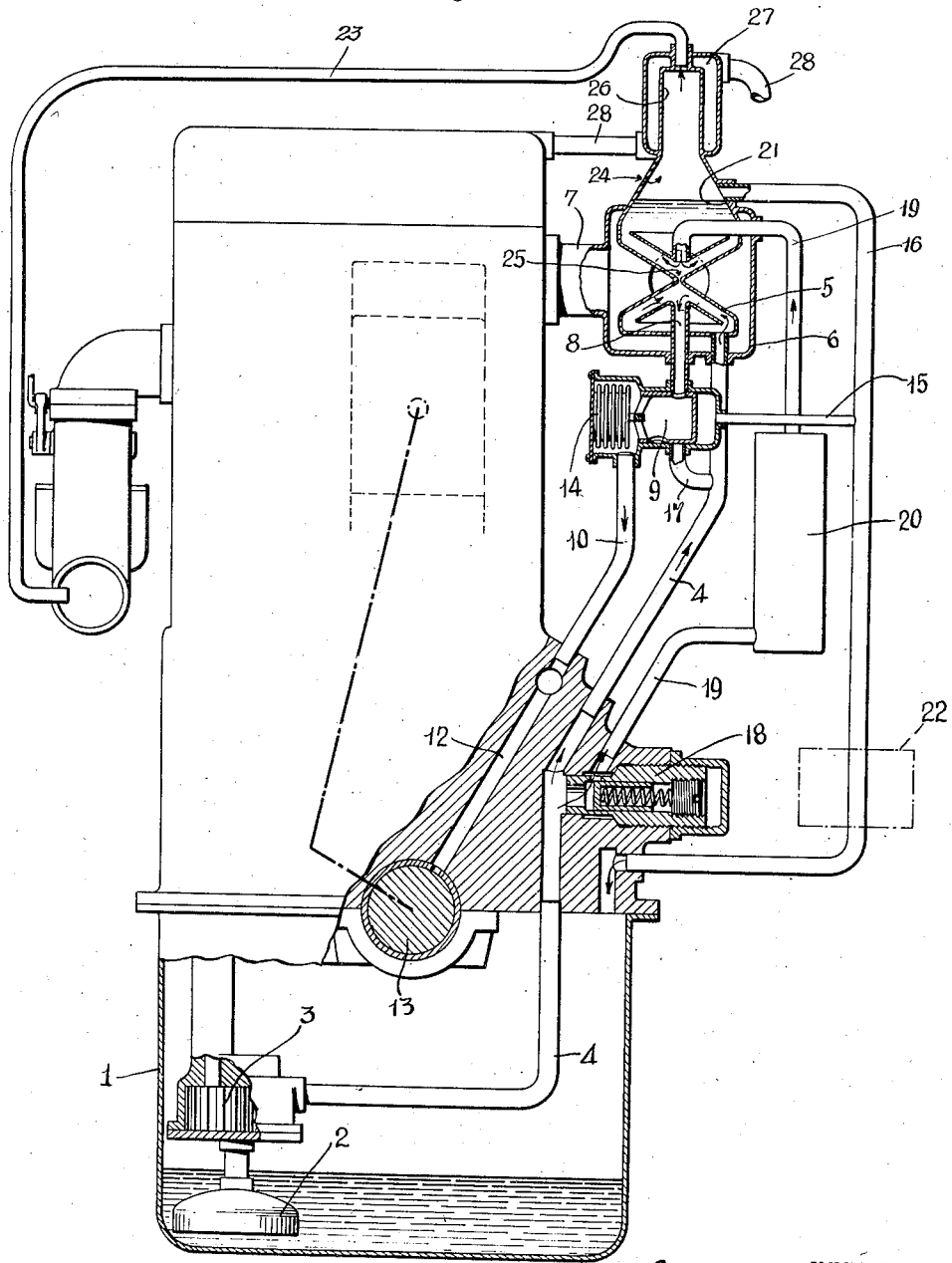
INVENTOR.
John Good
BY
ATTORNEYS.

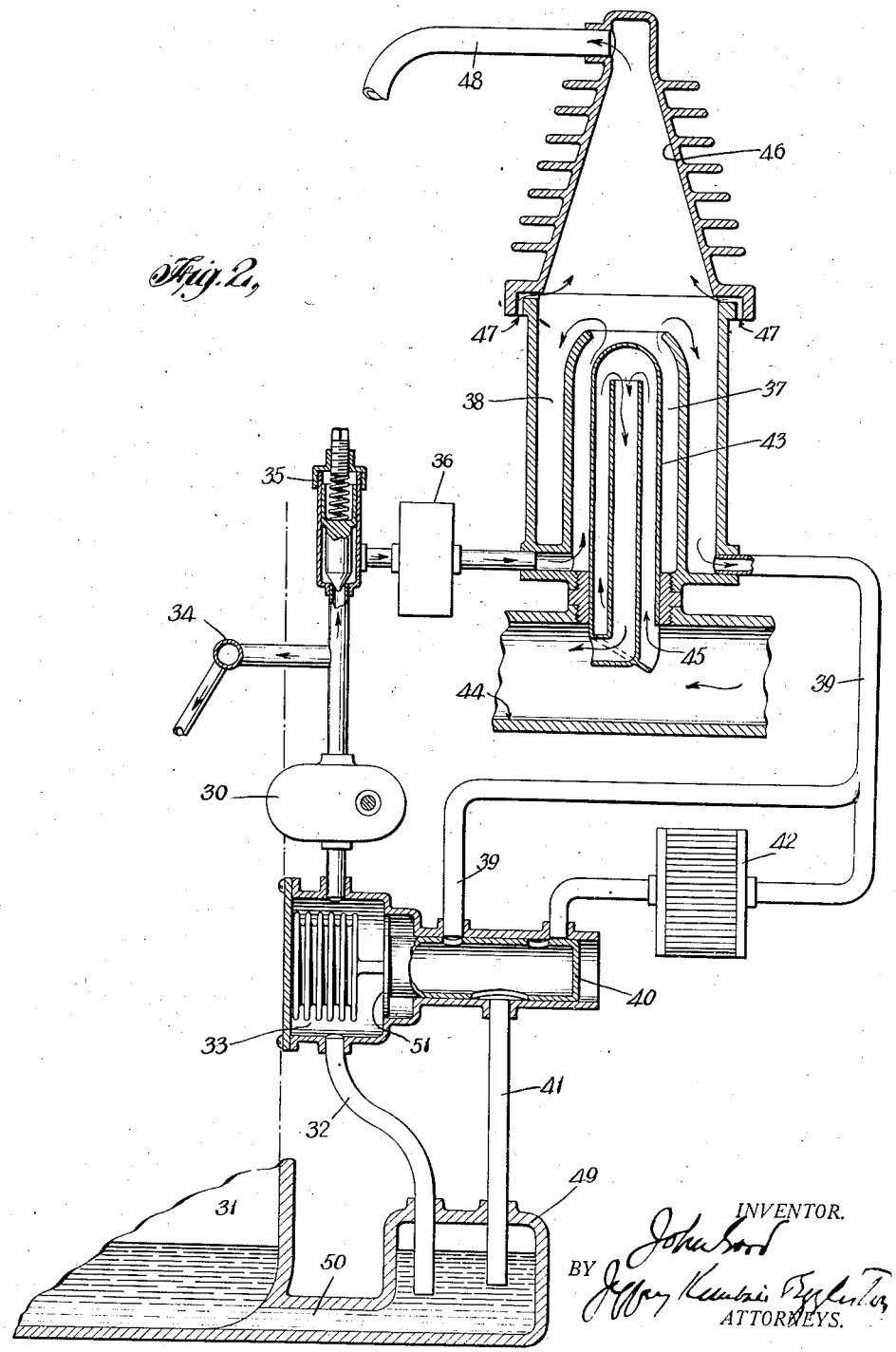

Patented Jan. 27, 1931

1,790,372

UNITED STATES PATENT OFFICE

JOHN GOOD, OF GARDEN CITY, NEW YORK, ASSIGNOR TO GOOD INVENTIONS CO., OF NEW YORK, N. Y., A CORPORATION OF NEW YORK

ENGINE-LUBRICATING SYSTEM

Application filed November 19, 1925. Serial No. 69,989.

The object of the invention is to provide an internal combustion engine, particularly automotive engines, with means for eliminating contamination from the lubricating oil and means for controlling the temperature of the oil delivered to the bearings, one or both, and also to provide a means whereby the engine receives warm oil very promptly when started cold. Other objects and features of the invention will appear from the disclosure below.

In the drawing, Fig. 1 represents, schematically, an internal combustion engine having one form of the invention applied, and Fig. 2 represents, also schematically, another form of the invention.

Referring first to Fig. 1, the engine is shown in outline with its crank case marked 1. In this crank case or in any other suitable reservoir the supply of lubricating oil is normally stored. From such reservoir the oil is drawn through a strainer 2 by the oil pump 3 and delivered into the oil pipe 4. The oil pump will be understood to be driven from the engine crank shaft in any usual or suitable way. From the oil delivery pipe 4 the oil is delivered into a chamber or reservoir 5 surrounded by or subject to the exhaust heat of the engine or to any other source of heat, such as might be provided, for example by a liquid fuel burner operated by the suction of the engine. In the present case the chamber 5 is located within an enlargement 6 of the exhaust pipe 7 of the engine, or in a branch from that pipe, so organized as to furnish adequate heat to said oil chamber 5. From the latter chamber the heated oil passes downwardly by pipe 8 to the casing of a thermally-controlled selector valve 9, passing through this valve and by pipe 10 reaching the oil manifold 11 and thence, by various branch pipes 12, to the crank shaft 13 and to other wear surfaces of the engine requiring lubrication. The selector valve 9 is operated by a thermostat 14 of the so-called sylphon or metallic bellows type and the valve itself is designed, as indicated in the drawing, so that the thermal operation of the bellows is unaffected by the pressure of the oil surrounding it, which may be in the neighborhood of twenty or thirty pounds. The neutralization of the oil pressure effect is accomplished by forming the valve hollow and with a piston wall whose diameter is equal to the mean diameter of the sylphon bellows, and arranged so that the pressure of the oil against it exactly balances the oil pressure on the bellows. The piston chamber of the valve piston is vented by a small pipe 15 leading to the overflow pipe 16. By this balancing means the sensitive sylphon type of thermal element is rendered available for the control of valve 9. Instead of this type a bimetallic thermal element might be employed, but would not be so effective, although it could be made satisfactory.

As the warm or hot oil from the chamber 5, entering the valve by pipe 8, raises the temperature of the thermostat, the selector valve is correspondingly and proportionately moved to open, more or less, a shunt passage 17 whereby cold or cool oil direct from pipe 4 and the pump may pass through delivery pipe 10 and oil manifold 11 to the engine bearings. This passage is a shunt around the oil heating chamber 5 as will be evident, and it will be understood that the thermostat is selected or adjusted so that it maintains an oil delivery to the bearings of fairly constant temperature.

The oil circuit, above described, between pump and bearings, constitutes the high pressure part of the lubricating system. The high pressure occurs as the result of the natural obstruction to escape that is represented by the crank shaft bearings and the other bearings served, as in all pressure-type lubricating systems. The excess oil delivered by the pump, which cannot pass to the engine bearings through the piping above referred to, by-passes them through the pressure relief valve 18 and passes into the low pressure pipe 19. The pressure relief valve is merely a spring-loaded escape valve, and its spring is adjusted to maintain a desired pressure in the high pressure side. These valves or their equivalents are necessary incidents to pressure lubricating systems and their function and design are well understood. The low pressure pipe 19 delivers directly, or through a suitable oil filter 20, to an oil chamber 21 which is also subject to heat, exhaust heat or otherwise, like the oil chamber 5 above referred to. Preferably, both oil chambers are contained in the same enlargement 6 of the main engine exhaust pipe or otherwise associated with it, so as to receive the necessary heat. From the oil chamber 21, the oil, under low pressure, overflows by the overflow pipe 16 and flows by gravity back to the crank case or reservoir. It may, if desired, pass through an oil cooler en route, by means of which any excess heat is removed from it. Such oil cooler is indicated diagrammatically by dotted lines 22. The oil filter 20 may be any suitable filtering device, for example one containing a fibrous filter material through which the oil passes and by which solid material therein is arrested.

The two oil heating chambers 5 and 21, the former containing oil under high pressure and the latter under low pressure, both constitute purifying stills. The heat to which they are subjected vaporizes any liquid fuel, gasoline, water or other contaminating liquid which may be contained in the oil. The vapors of such liquids are drawn off from the upper part of the chamber 21 and carried away to any suitable place of exhaust. Conveniently they are conducted by a small tube 23 which opens in, or close to, the air entrance of the carburetor, so that the suction effect in the latter creates a suction flow through the tube 23. The resulting vapors are thus consumed in the engine and are not obnoxious to the occupants of the vehicle. One or more small holes 24 may be, and preferably are, provided in the wall of the distilling chamber so that some air may enter at this point and assist in vaporizing the contaminating liquids and removing the vapors thereof.

The lower distilling chamber 5, which contains oil under the higher pressure, is connected to the upper distilling chamber 21 by a restricted bleed passage or hole, marked 25, the size of which is predetermined and quite small, so that it does not have the effect of appreciably reducing the pressure in the pressure side of the system but does allow such vapors of gasoline, water, etc., as may be produced in the lower chamber 5, to pass upwardly, together with some oil, into the upper chamber 21, there joining the similar vapors produced in that chamber and rising with them into the upper part of the chamber 21, to be carried off by the tube 23, as already described.

The upper part of the chamber 21 which is marked 26, constitutes a condenser and is located outside of the exhaust pipe enlargement or heater 6, where it is normally somewhat cooler than the distilling chambers 5 and 21. This condenser 26 is maintained at such temperature that any oil vapor rising into it is condensed and the condensate drops back into the chamber 21, or into the overflow and return pipe 16, while the vapors of gasoline, kerosene, water, etc., are not condensed, but remain in vapor form and pass or are drawn out through the tube 23 taking practically no oil vapor with them. A satisfactory condenser temperature for this purpose is around 280° to 300° F. and such temperature may be maintained in various ways to accomplish the purpose stated, but when a small amount of air or equivalent vaporizing medium, is admitted to the condenser chamber, as for example, through one or more fine air holes such as 24 above referred to I have found that the same selective effect is produced at a lower condenser temperature, say about 170° F. This fact enables me to maintain a proper selective temperature of the condenser by utilizing the cooling water of the engine for that purpose. The engine cooling water approximates 170 to 180° F. when the engine is in normal action. Accordingly, the condenser 26 may be water-jacketed, as indicated at 27, and connected by pipes 28 with the water-cooling system of the engine, so as to be in heat-exchanging relation to such system. In the case of air-cooled engines, an appropriate selection of cooling ribs or fins can be made so as to produce the same selective temperature, that is to say, a condenser temperature which will condense and throw down oil vapor but which will pass the vapors of any contaminating liquids in the oil.

It will be observed that the several parts above described can be compactly organized in the engine power plant, the water jacket 27 being preferably placed in the off-take of the engine water jacket, and that when thus organized, the whole equipment will occupy relatively small space, much smaller, of course, than indicated in the drawing, which, as before stated, is entirely schematic.

Referring to Fig. 2, the oil pump 30 takes oil from the engine crank case 31 by way of pipe 32 and the enclosing casing or chamber of thermostat 33, which in this case is on the suction side of the pump. The pump delivers the oil, under pressure, to the oil-distributing manifold 34 connected to the various bearings as will be understood. The excess oil which cannot pass through the bearings escapes past the pressure relief valve 35 and passes thence, direct or through an oil filter 36, to the annular chamber 37 from the top of which it overflows into the surrounding annular space 38 and thence, by gravity, through pipe 39 to the selector valve 40 and through the latter, if the oil be fairly cool, back to the crank case by way of return pipe 41, but if it is hot, through an oil cooler 42 which is connected as a shunt, as indicated. When the oil in the system reaches some predetermined temperature the thermostat 33 expands and moves the selector valve so that a part or all of the oil will be shunted through the oil cooler. This, as will be evident, can be made to maintain a proper temperature of the oil going to the bearings. The operation is clear in the drawing.

Heat is applied to the annular chamber 37 by means of an interior heating dome 43, which projects upwardly into it and is itself connected to the engine exhaust manifold 44. A suitable baffle arrangement 45 within the dome 43 serves to direct sufficient of the exhaust gas into the dome to maintain a distilling temperature in the latter.

It will be understood that the chamber 37 constitutes a distilling chamber converting into vapor the contaminating liquids in the oil and possibly also vaporizing some of the oil itself depending on the temperature of the exhaust gas. The top part 46 constitutes a condenser for the still and is maintained at the selective temperature, above referred to. As in the case above described, a small amount of air is admitted to the condenser by way of the air openings 47, so that the condenser action will occur at the lower temperature, about 170° F., thus producing the desired selective action between the oil vapor and the vapors of the contaminating liquids. The tube 48 compares with the tube 23 in the other figure and carries off the contamination vapors to the intake manifold or to the carburetor, or elsewhere, as desired. In this form of the invention, and merely for illustrative purposes, the critical temperature of the condenser is indicated as being maintained by the air cooling method, that is to say, by constructing it with an appropriate number of heat radiating ribs. When this method is employed the number of ribs on the condenser will depend somewhat on the location of the device with reference to the engine proper as well as the thermal characteristics of the latter, but it is to be understood that this chamber can be water-jacketed, as in the case of Fig. 1, if that should be necessary or preferred.

By connecting the outgoing and returning oil pipes 32 and 41 to a small chamber 49 communicating by means of a relatively small passage 50 with the oil in the crank case 31, a further desirable effect is produced in that the oil in the small chamber 49 becomes quickly warmed as the result of its passage through the distilling chamber and is thereby immediately available to be taken up by the pump and delivered to the engine bearings. In this case the small chamber 49 constitutes the oil supply reservoir for the lubricating system but is itself supplied with oil as needed by virtue of its connection with the larger reservoir represented by the engine crank case. The arrangement (broadly claimed in my copending application Serial No. 395,440, filed July 12, 1920) provides for the almost immediate delivery of warm oil to the bearings and is of great advantage when the engine is being started when cold.

It will be observed that the sylphon thermostat 33 is provided with a counterbalancing piston 51 to balance the suction effect thereon, analogously to the design of the selector valve in Fig. 1. As in Fig. 1, also, it will be understood that the device of Fig. 2 may be variously and compactly organized in the engine power plant and that the physical forms of the several parts may be widely varied from those indicated in Fig. 2, which, as already stated, is mainly schematic. It will be understood that the pressure relief valve is adjustable as customary and that the oil pump 30 is driven by the engine, also that the oil cooler 42 may be of any appropriate design and may, for example, be merely a length of thin tubing exposed to the atmosphere.

In both forms above described, as illustrative of the principles of the invention, it should be noted that the means for removing contamination in the oil are without moving parts, that the oil heating chambers receive and pass the oil in proportion to the delivery of the oil pump and continuously while the latter is in action and that no control of the heat applied to the stills is necessary, since excessive heat cannot result in wastage of oil as oil vapor. In both cases also the heat of the oil still is utilized to provide warm oil to the bearings when the engine is started cold and to temper the normal supply at other times.

I claim:

1. The combination in an engine lubricating system of a distilling chamber for the oil in said system, a condenser for said distilling chamber and means for maintaining said condenser at a temperature which condenses oil vapor but does not condense the vapors of contaminating liquids therein, and means for removing the latter vapors from the condenser.

2. The combination in an engine lubricating system, of a distilling chamber for the oil in said system, a condenser above said chamber and adapted for delivering condensate into it, means for maintaining said condenser at a temperature which condenses oil vapor but does not condense vapors of contaminating liquids therein and means for removing the latter vapors from the condenser.

3. The combination in an engine lubricating system, of a distilling chamber, a condenser therefor, means providing an air flow through said condenser and means for maintaining the condenser at a temperature which condenses the oil vapor but does not condense the vapors of contaminating liquids therein.

4. The combination in an engine, of a lubricating circuit including the crank case, a distilling chamber included in said circuit, a condenser therefor, means for maintaining an air flow through said condenser and means for maintaining said condenser at a temperature which condenses the oil vapor but does not condense the vapors of contaminating liquids therein.

5. The combination in an engine, of a lubricating circuit including an oil pump, a distilling chamber receiving a continuous flow of oil in proportion to the delivery by said pump, a condenser for said distilling chamber, means for maintaining said condenser at a temperature which condenses oil vapor but does not condense the vapors of contaminating liquids therein and means for removing the latter vapors from the condenser.

6. The combination in an engine, of an oil circuit including a pump, a distilling chamber into which oil is continuously delivered by the pump and from which it continuously passes on through the circuit, means whereby said chamber is heated, means whereby oil vapor produced therein is condensed and retained in the circuit and means for removing the vapors of contaminating liquid in the oil.

7. In an internal combustion engine, a lubricating system, a distilling chamber for the oil thereof, and a condenser for said chamber in heat exchanging relation to the engine water cooling system.

8. In an internal combustion engine, a lubricating system, a distilling chamber for the oil thereof, a condenser for said chamber in heat exchanging relation to the engine water cooling system and means for producing an air flow through the condenser.

9. In an internal combustion engine, a lubricating system, a distilling chamber for the oil thereof, a condenser for said chamber, means arranged to maintain the temperature of said condenser at approximately 170° to 180° and means for admitting a vaporizing flow into said condenser.

10. In an engine lubricating system, means for controlling the temperature of the oil comprising a source of relatively cool oil, a distilling chamber constituting a source of relatively hot oil and means for passing variable amounts of oil from each source to the engine bearings.

11. In an engine, an oil circuit including a pump and a distilling chamber the oil discharge from the distilling chamber being located in a position to deliver oil adjacent the intake of the pump, whereby the latter is supplied, in part, by the warm oil so delivered.

12. In an engine, an oil circuit including a pump, a connection therefrom to the surfaces to be lubricated, and a distilling chamber, the oil discharge from said chamber and the intake of the pump being connected to a small oil reservoir which is supplied by a larger reservoir such as the engine crank case.

13. In a pressure lubricating system, distilling chambers interposed in both the high pressure and low pressure sides of the system and means for removing contamination vapors from both chambers.

14. In a pressure lubricating system, a distilling chamber in the low pressure side of the system, a condenser means for maintaining the condenser at a temperature adapted to condense and return oil vapor but not contamination vapor and means for removing and disposing of the latter.

15. In a pressure lubricating system, a distilling chamber subjected to exhaust gas heat and a condenser chamber above said chamber arranged in heat exchanging relation to the engine water-cooling system.

16. In a pressure lubricating system, a selector valve controlling the flow of oil of different temperatures, a bellows type thermostat exposed to the oil in said circuit to move said valve and means for balancing the oil pressure effect on said bellows.

17. In an internal combustion engine the combination with the lubricating system of oil heating means, oil cooling means, a selector valve for controlling flows of oil of different temperatures and a control member for operating said valve.

18. In an internal combustion engine, means for maintaining an oil reservoir at a temperature sufficient to evaporate the fuel used in the engine, means for tempering the hot oil with a controlled addition thereto of cooler oil, and means for delivering the mixture to the lubricated surfaces of the engine.

19. In an internal combustion engine, a lubricating system including a pump and a distilling chamber for the oil thereof, and automatic means operative when the engine is cold to cause the hot oil from said chamber to be delivered to the engine bearings.

20. In a pressure lubricating system the combination with a source of supply, of a pump, a delivery line therefrom to the surfaces to be lubricated and a pressure relief valve controlling a return to the supply source, and a restricted bleed passage connecting the high and low pressure sides of the system, said passage adapted to restrain oil flow but permit the escape of vapor.

21. In a pressure lubricating system the combination of a source of relatively cool oil, an oil line connecting the same with the surfaces to be lubricated, means for applying heat to a portion of said line, a shunt line around said heating means, a thermostatically controlled valve arranged to vary the flow through the shunt and through the portion of the line subject to the heating means, and a pump for circulating the oil through the system.

22. In a pressure lubricating system the combination with a source of supply, of a pump, a delivery line therefrom to the surfaces to be lubricated, a pressure relief valve controlling a return to the supply source, the high and low pressure sides of the system being connected with each other by a restricted bleed passage, and means for applying heat to a portion of said line on the high pressure side of the system.

23. The combination with an engine, an oil reservoir constituting the engine crank case, a small reservoir supplied by the crank case, a pump connected with said small reservoir, oil heating means and means for delivering warm oil to said small reservoir.

24. The combination in an engine lubricating system of a distilling chamber, a condenser for said chamber and means for moderating the engine-developed heat to maintain the condenser at a temperature of approximately 180°, for the purpose described.

In testimony whereof, I have signed this specification.

JOHN GOOD.